(12) United States Patent
Flosser et al.

(10) Patent No.: US 9,550,912 B2
(45) Date of Patent: Jan. 24, 2017

(54) CURING AGENT FOR EPOXY COATINGS

(71) Applicant: Momentive Specialty Chemicals Inc., Stafford, TX (US)

(72) Inventors: David Flosser, Missouri City, TX (US); Patricia Garcia, Katy, TX (US); Larry Steven Corley, Houston, TX (US); Bedri Erdem, Missouri City, TX (US); Lucy Phan, Tomball, TX (US)

(73) Assignee: HEXION INC, Columbus, OH (US)

( * ) Notice: Subject to any disclaimer, the term of this patent is extended or adjusted under 35 U.S.C. 154(b) by 0 days.

(21) Appl. No.: 14/576,848

(22) Filed: Dec. 19, 2014

(65) Prior Publication Data

US 2016/0177125 A1    Jun. 23, 2016

(51) Int. Cl.
| | |
|---|---|
| *C08L 63/00* | (2006.01) |
| *C08G 59/50* | (2006.01) |
| *C09D 163/00* | (2006.01) |
| *C08G 59/02* | (2006.01) |
| *C08G 59/56* | (2006.01) |

(52) U.S. Cl.
CPC ............. *C09D 163/00* (2013.01); *C08G 59/02* (2013.01); *C08G 59/502* (2013.01); *C08G 59/56* (2013.01)

(58) Field of Classification Search
CPC ..... C09D 163/00; C08G 59/02; C08G 59/502; C08G 59/56
USPC .................................... 528/87, 120; 523/400
See application file for complete search history.

(56) References Cited

U.S. PATENT DOCUMENTS

| | | |
|---|---|---|
| 4,507,412 A | 3/1985 | Hickner et al. |
| 5,246,984 A | 9/1993 | Darwen et al. |
| 5,670,612 A | 9/1997 | Kihara et al. |
| 6,916,505 B2 | 7/2005 | Raymond et al. |
| 7,528,183 B2 | 5/2009 | Lohe et al. |
| 7,615,584 B2 | 11/2009 | Matthias et al. |
| 2004/0242836 A1 | 12/2004 | Hayes |
| 2008/0045659 A1 | 2/2008 | Hakuya et al. |
| 2008/0114094 A1 | 5/2008 | Shah et al. |
| 2009/0042036 A1 | 2/2009 | Kato |

*Primary Examiner* — David Karst

(57) ABSTRACT

Compositions, methods, and coating composition using a curing agent are provided herein. In one embodiment, a curing agent for epoxy resins may be prepared using a formulation including: (a) an adduct of: (i) a diglycidyl ether of a bisphenol, and (ii) a first polyamine; (b) a second polyamine; and (c) water; wherein the composition has an amine hydrogen equivalent weight, based on solids, of less than or equal to 105.

15 Claims, No Drawings

CURING AGENT FOR EPOXY COATINGS

BACKGROUND OF THE INVENTION

Field of the Invention

The present invention relates to epoxy coatings. The present invention particularly relates to curing agents for epoxy coatings.

Background of the Art

Historically, epoxy coatings are well known in the art for many end-use applications. One component necessary to preparing an epoxy coating is a curing agent. The curing agent is the component which is employed to render precursor resins into hardened coatings, often by pushing to completion the reaction of residual reactive species.

Typical commercially available waterborne curing agents based on polymeric adducts of polyamines with an epoxy resin have an amine hydrogen equivalent weight (AHEW), based on solids, of greater than 105. The consequence of this is that it requires high amine loadings in the coating formulation. Typical curing agent loadings are 1:1 to 4:1 epoxy: amine loading ratio (by weight) to form these coatings. The high amine loading ratio is necessary to achieve the appropriate equivalent ratio of epoxy to amine in the formulation in order to achieve proper cure of the coating by the adducts.

Further, a large amount of curing agent, typically at least 25% of the epoxy component weight, is required when grinding the pigmented side of a coatings formulation with the amine, in order to achieve adequate wetting of the pigment during the grind. High amine loadings result in greater hydrophilicity in the cured coating network due to the presence of high amounts of amine nitrogen and other hydrophilic components in the curing agent composition, leading to reduced corrosion resistance and greater water penetration. It would be desirable in the art to provide curing agents with low AHEW, which would allow for low amine loading in the hardenable film forming composition, resulting in lower hydrophilicity and improved corrosion resistance, as well as less color transfer from the curing agent to the cured film.

The low loading of the amine would also contribute to less blushing in a clear formulation, particularly for curing agents with primary amine nitrogen groups. It would be desirable in the art to provide curing agents which allow adequate pigment wetting at low loading levels when grinding the pigmented side of a paint formulation. The low amine loading would further offer a cost advantage, due to decreased demand for the curing agent component. There is a need for low color amine curing agents, which offer advantages in paint formulations which are color sensitive. There is a need for reduced cycle time of curing agent preparation, primarily for reduction in fixed costs during manufacture.

SUMMARY OF THE INVENTION

Embodiments of the invention are directed to curing agents, resins and coatings using the curing agents, and the processes for making the curing agents, resins and coatings.

In one aspect, the invention is a curing agent for epoxy coatings comprising a composition of: an adduct of a diglycidyl ether of a bisphenol and a first polyamine; a second polyamine different than the first polyamine; and water; wherein the resulting product has an amine hydrogen equivalent weight, based on solids less than or equal to 105. The epoxy equivalent weight of the diglycidyl ether of a bisphenol may be from about 200 to about 300. The first polyamine may have an amine hydrogen equivalent weight from about 7 to about 35. The composition may be a solution. The adduct may have a weight average molecular weight of 1150 or less.

In another aspect, the invention is a curing agent prepared by a process comprising mixing a diglycidyl ether of a bisphenol with a first polyamine under reaction conditions sufficient to form a resin, wherein the first polyamine is present at an equivalent concentration of at least about 8 $NH_2$ equivalents per epoxy equivalent, removing excess first polyamine to form a resin, adding water and a second polyamine. The second polyamine may be different that the first polyamine. The water and the second polyamine may be added to the high viscosity resin to reduce the viscosity of the resin for ease of handling. The epoxy equivalent weight of the diglycidyl ether of a bisphenol may be from about 200 to about 300. The first polyamine may have an amine hydrogen equivalent weight from about 7 to about 35. The composition of an adduct of a diglycidyl ether of a bisphenol, and a first polyamine; a second polyamine; and water may have an amine hydrogen equivalent weight, based on solids less than or equal to 105.

In still another aspect, the invention is a coating comprising the reaction product of a curable epoxy resin with curing agent for epoxy coatings comprising a composition of: an adduct of a diglycidyl ether of a bisphenol and a first polyamine; a second polyamine different than the first polyamine; and water; wherein the resulting product has an amine hydrogen equivalent weight, based on solids less than or equal to 105. The epoxy equivalent weight of the diglycidyl ether of a bisphenol may be from about 200 to about 300. The first polyamine may have an amine hydrogen equivalent weight from about 7 to about 35. The composition may be a solution. The adduct may have a weight average molecular weight of 1150 or less.

In still another aspect, the invention is a coating comprising the product of a curable epoxy resin with a curing agent prepared by a process comprising mixing a diglycidyl ether of a bisphenol with a first polyamine under reaction conditions sufficient to form a resin, wherein the first polyamine is present at an equivalent concentration of at least about 8 $NH_2$ equivalents per epoxy equivalent, and removing excess first polyamine to form a resin, adding water and a second polyamine. The water and the second polyamine may be added to the high viscosity resin to reduce the viscosity of the resin for ease of handling. The epoxy equivalent weight of the diglycidyl ether of a bisphenol may be from about 200-300. The first polyamine may have an amine hydrogen equivalent weight from about 7 to about 35. The composition of an adduct of a diglycidyl ether of a bisphenol and a first polyamine; a second polyamine; and water may have an amine hydrogen equivalent weight, based on solids less than or equal to 105.

DETAILED DESCRIPTION

Embodiments of the invention are directed to curing agents, resins and coatings using the curing agents, and the processes for making the curing agents, resins and coatings. It has been observed that the curing agents as described herein exhibit low amine loading in paint formulations, low color, water dilatability, fast dry time, good hardness development, 2-3 hour pot life, good chemical resistance (MEK), good adhesion, no VOC, low blushing, and, most importantly, excellent corrosion resistance when applied to metal. All molecular weights described herein are weight average molecular weights.

One embodiment of the invention is a curing agent for epoxy coatings comprising a composition of: (a) an adduct of a diglycidyl ether of a bisphenol, and a first polyamine; (b) a second polyamine; and (c) water; wherein the resulting product has an amine hydrogen equivalent weight (AHEW), based on solids less than or equal to 105, such as from about 30 to about 105. In some embodiments, the amine hydrogen equivalent weight may be less than or equal to 98, such as from about 50 to about 98. In one desirable embodiment, the amine hydrogen equivalent weight may be from about 87 to about 96.

The epoxy equivalent weight of the diglycidyl ether of a bisphenol used to make the adduct may be from about 200 to about 300. In some embodiments, the epoxy equivalent weight may be from about 220 to about 285. In one desirable embodiment, the epoxy equivalent weight may be from about 235 to about 263.

Suitable diglycidyl ethers of bisphenols may be represented by the following formulas (I and II). Examples of diglycidyl ethers of bisphenols may include bisphenol A diglycidyl ether (including its oligomers), bisphenol F diglycidyl ether (including its oligomers) and combinations thereof.

example, from 52 wt. % to 39 wt. % of the material to form the adduct, and the first polyamine may comprise from 49 wt. % to 84 wt. %, such as from 49 wt. % to 73 wt. %, for example, from 49 wt. % to 61 wt. % of the material to form the adduct, where the total weight percent of both the diglycidyl ether of a bisphenol and the first polyamine is 100 wt. %.

The first polyamine may have an amine hydrogen equivalent weight from about 7 to about 35. In some embodiments, the first polyamine may have an amine hydrogen equivalent weight from about 13 to about 27. In one desirable embodiment, the first polyamine may have an amine hydrogen equivalent weight of 15. The first polyamine may have boiling temperatures of 350° C. or less, such as from about 350° C. to about 80° C., for example, from about 120° C. to about 110° C. at atmospheric pressure. Preferred first polyamines also have distillation temperatures of less than or equal to 180° C., such as from 80° C. to 180° C., for examples, from 110° C. to 122° C. at a pressure of 101325 Pascal (Pa).

Suitable first polyamines may be represented by the following formula (III). Examples of the first polyamines useful with the method of the application include but are not

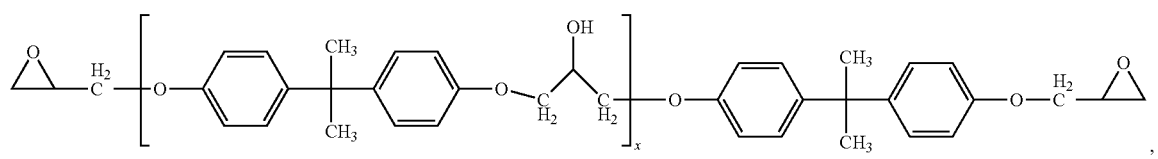

(I)

wherein x is from 0 to about 16)

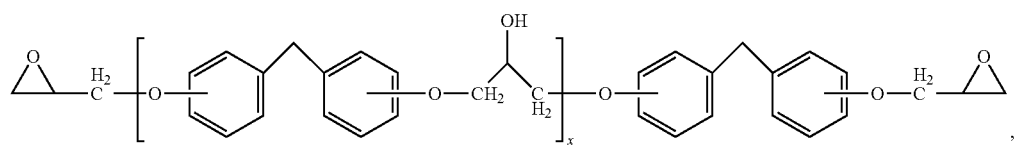

(II)

wherein x is from 0 to about 16)

An example of a suitable diglycidyl ether of a bisphenol includes a diglycidyl ether of bisphenol A, having an epoxy equivalent weight based of 230-280, which is commercially available as EPON™ 834 resin. The EPON™ 834 may optionally be dissolved at 90% solids in xylene for easier handling.

In the process to prepare the adduct and the subsequent resin, the first polyamine is present at an equivalent concentration of at least about 8 NH$_2$ equivalents per epoxy equivalent. For the purposes of this application, this limitation is defined to mean that there are at least 8 NH$_2$ equivalents (NH$_2$ groups) per epoxy used to prepare the adduct. NH$_2$ equivalents may also be described as primary nitrogen equivalents (primary nitrogen groups).

In forming the adduct the diglycidyl ether of a bisphenol and the first polyamine may be added in an equivalent ratio of epoxy to NH$_2$ equivalents from about 1:8 to about 1:40, such as from about 1:8 to about 1:20, for example, from about 1:8 to about 1:12. Alternatively, in forming the adduct the diglycidyl ether of a bisphenol may comprise from 52 wt. % to 16 wt. %, such as from 52 wt. % to 27 wt. %, for limited to diethylene triamine, ethylene diamine, triethylene diamine, hydrazine, and combinations thereof. Ethylene diamine (EDA) is a preferred first polyamine since EDA has been observed to provide better general film properties including hardness, direct impact, chemical resistance, and corrosion resistance.

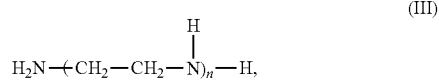

(III)

wherein n=1-6.

The adduct may comprise from 20 wt. % to 100 wt. %, such as from 40 wt. % to 80 wt. %, for example, from 55 wt. % to 60 wt. % of the composition. The adduct may have a weight average molecular weight of 1150 (daltons) or less, such as from about 580 to about 1000, for example, from about 880 to about 975.

The second polyamine may have an amine hydrogen equivalent weight from about 20 to about 1000. In some embodiments, the second polyamine may have an amine hydrogen equivalent weight from about 40 to about 120. In one desirable embodiment, the second polyamine may have an amine hydrogen equivalent weight from about 55 to about 60. In one embodiment of the invention, the second polyamine has a greater amine hydrogen equivalent weight than the amine hydrogen equivalent weight of the first polyamine. In one embodiment of the invention, the second polyamine is a different polyamine than the first polyamine.

The second polyamines useful with the compositions of the application include, but are not limited to polyetheramine compounds including polyetheramines sold under the trademark JEFFAMINE®. The polyetheramine compounds have several general formulas. One such formula is:

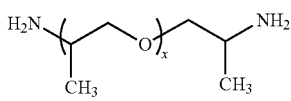
(IV)

wherein x is from about 2.5 to about 68. In one embodiment, x is from 2.5 to 6.1. One preferred embodiment is JEFFAMINE® D-230, which is a polyoxypropylenediamine with an x of about 2.5 and a molecular weight of about 230.

Another general formula for a polyetheramine is:

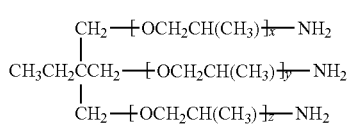
(V)

wherein x+y+z is an integer ranging from about 5 to about 85.

Other general formulas for polyetheramine include formula (VI):

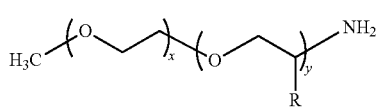
(VI)

Where R=a hydrogen atom (H) for ethylene oxide (EO) and R=$CH_3$ for propylene oxide (PO) and where x=1 when y=9, x=19 when y=3, and x=6 when y=29-35 The PO/EO ratio may be from about 9:1 to about 10:31, such as 9:1, 3:19, 29:6, or 10:31; and formula (VII):

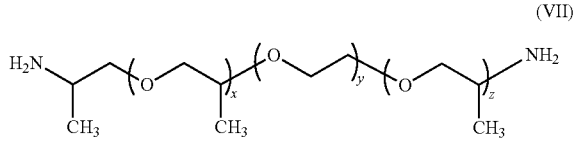
(VII)

where x+Z is 1.2-6 and y is 2-39. The molecular weight average (Mw) for such formula (VI) polyetheramines ranges from about 600 to about 2000.

Examples of suitable second polyamines useful with the method of the application include but are not limited to diethylene triamine, triethylenetetraamine, hexamethylenediamine, trimethylhexamethylene diamine, tetraethylene pentaamine, N,N',-dimethylpropylenediamine, 1,3-bis(4-amino-3-methylcyclohexyl)methane, bis(p-aminocyclohexyl) methane, 2,2-bis(4-aminocyclohexyl)propane, 3,5,5-trimethyl-3-(aminomethyl)-cyclohexylamine, N-aminoethyl-piperazine, m-phenylenediamine, p-phenylenediamine, bis(p-aminophenyl)methane, bis(p-aminophenyl)sulfone, m-xylylenediamine, 1,2-diaminocyclohexane, 1,4-diaminocyclohexane, 1,3-bis(aminomethyl) cyclohexane, 1,4-bis(aminomethyl)cyclohexane, and combinations thereof.

In one embodiment, the second polyamine is a different polyamine than the first polyamine. In the embodiment of the second polyamine different than the first polyamine, the second polyamine is a polyetheramine as described herein by formulas (IV), (V), (VI), and (VII). Examples of suitable second polyamines include the following polyetheramines polyoxypropylenediamine with a molecular weight of about 230, polyoxypropylenediamine with a molecular weight of about 430 and combinations thereof. One example of this embodiment is when the first polyamine is ethylene diamine, and the second polyamine is a polyetheramine, such as polyoxypropylenediamine with a molecular weight of about 230, commercially available as JEFFAMINE™ D-230 (x is 2.5 for Formula (IV), or polyoxypropylenediamine with a molecular weight of about 430 commercially available as JEFFAMINE™ D-400 (x is 6.1 for Formula (IV), both of which are commercially available from Huntsman Inc, of Woodlands, Tex.

In an alternative embodiment, the first polyamine and the second polyamine may also be the same polyamine.

The second polyamine may comprise from 5 wt. % to 50 wt. %, such as from 10 wt. % to 40 wt. %, for example, from 13 wt. % to 18 wt. % of the composition. Water may comprise from 10 wt. % to 65 wt. %, such as from 15 wt. % to 40 wt. %, for example, from 23 wt. % to 27 wt. % of the composition.

In another embodiment, the invention is a curing agent prepared by a process comprising mixing a diglycidyl ether of a bisphenol with a first polyamine under reaction conditions sufficient to form a resin, and removing excess first polyamine. In forming the adduct, the first polyamine is initially present at an equivalent ratio of epoxy to $NH_2$ equivalents from about 1:8 to about 1:40, such as from about 1:8 to about 1:20, for example, from about 1:8 to about 1:12. Water and a second polyamine may be added to the resin to reduce the viscosity of the resin for ease of handling. The resin before addition of water and the second polyamine may have a viscosity from about 500,000 cp to about 1,500,000 cp. The resin after addition of water and the second polyamine may have a viscosity from about 5,000 cp to about 14,000 cp.

In one embodiment, the curing agent composition comprises the adduct in an amount from about 10 wt. % to about 90 wt. %, such as from about 40 wt. % to about 70 wt. %, for example, from about 55 wt. % to about 60 wt. % of the composition; the second polyamine in an amount from about 10 wt. % to about 90 wt. %, such as from about 10 wt. % to about 25 wt. %, for example, from about 15 wt. % to about 20 wt. % of the composition, and water in an amount from about 1 wt. % to about 50 wt. %, such as from about 10 wt. % to about 30 wt. %, for example, from about 23 wt. % to about 28 wt. %, of the composition wherein the total weight percent of the adduct, second polyamine, and water is 100 wt. %. In an alternative embodiment, the composition is free of water (0 wt. % water).

In one embodiment, the curing agent composition is in the form of a solution. In such a solution embodiment, the composition is free of particles. In another embodiment, the composition is free of surfactants, free of dispersing agents, or free of both.

As noted above, in at least some embodiments of the method of the application, water and a second polyamine may be added to the resin. At least one reason for doing this is to reduce the viscosity of the resin to permit easier handling. The curing agents of the application may be desirably diluted by weight with water to at least 100% (1:1 curing agent: water). The resultant composition may be substantially clear, even in the substantial absence of acids and/or solvents. For the purposes of this application, the term "substantially clear" means substantially transparent and free of particles or settling, when viewed by the naked eye. The term "substantial absence of acids and/or solvents" means that inorganic or organic acids and solvents other than water, and are present only at a concentration of less than or equal to 100 ppm including 0 ppm.

In the process of the application, an initial excess of first polyamine is used to prepare an adduct. The initial excess of first polyamine is achieved by the use of greater than or equal to 8 $NH_2$ equivalents per epoxy equivalent. After the adduct is formed, the excess first polyamine is removed from the resins, typically by distillation. When distillation is used, in most embodiments it is a vacuum distillation. In at least one embodiment, the first polyamine is distilled until the first polyamine concentration is less than or equal to 1000 ppm by weight in the adduct. The first polyamine distillate may be recycled.

The curing agent is soluble in water up to a weight ratio of 1 g of curing agent per 1 g of water.

The curing agent composition may further include one or more additives including acids, organic solvents, surfactants, fillers, defoamers, leveling agents, flow agents, wetting agents, cure rate accelerators, and combinations thereof. The additives may comprise less than or equal to 60 wt. %, such as from 0 wt. % to 60 wt. % of the product. If present, the one or more additives may comprise from 0.01 wt. % to 60 wt. %, for example, from 0.1 wt. % to 25 wt. % of the curing agent composition.

In still another embodiment, the invention is a product, or reaction product, such as a coating formulation, of a curable epoxy resin with a curing agent comprising a composition of: (a) an adduct of (i.) a diglycidyl ether of a bisphenol, and (ii.) a first polyamine; (b) a second polyamine; and (c) water; wherein the curing agent has an amine hydrogen equivalent weight, based on solids, less than or equal to 105. Mixing may be used to help form the reaction product. In many embodiments, the curing agent is prepared by a process comprising mixing a diglycidyl ether of a bisphenol with a first polyamine under reaction conditions sufficient to form a resin, wherein the first polyamine is present at an equivalent concentration of at least about 8 $NH_2$ equivalents per epoxy equivalent as described herein, and removing excess first polyamine to form a resin. The product may be applied to a substrate and form a coating. This product may be a coating formulation.

The product includes curable epoxy resin which is added in an amount from about 0.5 to about 2 epoxy equivalents per NH equivalent in the formulation, such as from about 1 to about 1.7 epoxy equivalents per NH equivalent, for example, from about 1.2 to about 1.3 epoxy equivalents per NH equivalent. Alternatively, the product includes the curing agent which is added in an amount from about 0.3 to about 1.5 NH equivalents per epoxy equivalent in the formulation, such as from about 0.7 to about 1 NH equivalents per epoxy equivalent, for example from about 0.6 to about 0.8 NH equivalents per epoxy equivalent.

Alternatively in forming the product, or reaction product, such as a coating formulation, the product may include from about 1 wt. % to 99 wt. %, for example, from about 1 wt. % to about 99 wt. % curable epoxy resin and from about 5 wt. % to 50 wt. %, for example, from about 5 wt. % to about 50 wt. % of the curing agent, where the total amount of curable epoxy resin and the curing agent equal 100 wt. % of the combination of curable epoxy resin and the curing agent.

The epoxy resins useful in preparing the coatings of the invention may be saturated or unsaturated, aliphatic, cycloaliphatic, aromatic or heterocyclic and may contain pendant hetero-atoms and functional groups. The epoxy resin may also be monomeric or polymeric. The epoxy resin compound utilized may be, for example, an epoxy resin or a combination of epoxy resins prepared from an epihalohydrin and a phenol or a phenol type compound, prepared from an epihalohydrin and an amine, prepared from an epihalohydrin and a carboxylic acid, prepared from an epihalohydrin and compounds having at least one aliphatic or cycloaliphatic hydroxyl group, or prepared from the oxidation of unsaturated compounds.

In one embodiment, the epoxy resin includes those resins produced from an epihalohydrin and a phenol or a phenol type compound. The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (i.e. the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, and combinations thereof.

In another embodiment, the epoxy resin includes those resins produced from an epihalohydrin and bisphenols, halogenated bisphenols, hydrogenated bisphenols, novolac resins, and polyalkylene glycols, or combinations of two or more thereof.

In another embodiment, the epoxy resin includes those resins produced from an epihalohydrin and resorcinol, catechol, hydroquinone, biphenol, bisphenol A, bisphenol AP (1,1-bis(4-hydroxyphenyl)-1-phenylethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins, tetramethylbiphenol, tetramethyl-tetrabromobiphenol, tetramethyltribromobiphenol, tetrachlorobisphenol A, hydrogenated bisphenol A, 1,4-cyclohexanediol, 1,4-cyclohexane dimethanol, and combinations thereof.

The preparation of epoxy resins is known in the art. See Kirk-Othmer, Encyclopedia of Chemical Technology, 3rd Ed., Vol. 9, pp 267-289. Examples of epoxy resins and their precursors suitable for use in the compositions of the invention are also described, for example, in U.S. Pat. Nos. 5,137,990 and 6,451,898 which are incorporated herein by reference.

Examples of suitable epoxy resin components include, but are not limited to, EPON™ Resins 825, 826, 828, 862 and 1001 commercially available from Momentive Specialty Chemicals Inc., of Columbus, Ohio.

In another embodiment, the epoxy resin includes those resins produced from an epihalohydrin and an amine. Suitable amines include diaminodiphenylmethane, aminophenol, xylenediamine, anilines, and the like, or combinations of two or more thereof.

In another embodiment, the epoxy resin includes those resins produced from an epihalohydrin and a carboxylic acid. Suitable carboxylic acids include phthalic acid, isophthalic acid, terephthalic acid, tetrahydro- and/or hexahydrophthalic acid, endomethylenetetrahydrophthalic acid, methylhexahydrophthalic acid, and the like, and combinations thereof In another embodiment, the epoxy resin includes those resins produced from an epihalohydrin and compounds having at least one aliphatic or cycloaliphatic hydroxyl group. In this embodiment, it is understood that such resin compositions contain an average of more than one hydroxyl group. Examples of compounds having at least one aliphatic or cycloaliphatic hydroxyl group per molecule include aliphatic or cycloaliphatic alcohols, glycols, polyols, polyether diols, polyether triols, polyether tetrols, any combination thereof and the like. Examples of the glycols or polyols include, but are not limited to, 1,4-butanediol, 1,5-pentanediol, 1,6-hexanediol, neopentyl glycol, cyclohexanedimethanol, hydrogenated BPA, polyethylene glycol, polypropylene glycol, trimethylolethane, trimethylolpropane, and combinations thereof. Examples of polyglycidyl ethers of aliphatic glycols include 1,6 hexanediol diglycidyl ether (HDDGE) and 1,4 butanediol diglycidyl ether (BDDGE). Commercially available examples include, but are not limited to, HELOXY™ Modifier 32 (a diglycidyl ether of a poly(propylene oxide) glycol), HELOXY™ Modifier 68 (the diglycidyl ether of neopentyl glycol), HELOXY™ Modifier 67 (the diglycidyl ether of 1,4-butanediol), HELOXY™ HD (the diglycidyl ether of 1,6 hexanediol), and HELOXY™ Modifier 107 (the diglycidyl ether of 1,4-cyclohexanedimethanol), and combinations thereof all available from Momentive Specialty Chemicals Inc.

The product may further include one or more additives including acids, organic solvents, surfactants, fillers, defoamers, leveling agents, flow agents, wetting agents, cure rate accelerators, and combinations thereof. The additives may comprise less than or equal to 60 wt. %, such as from 0 wt. % to 60 wt. % of the product. If present, the one or more additives may comprise from 0.01 wt. % to 60 wt. %, for example, from 0.1 wt. % to 25 wt. % of the product, where the total amount of curable epoxy resin, the curing agent, and the additives equals 100 wt. % of the combination of curable epoxy resin, the curing agent, and the additives.

In at least one embodiment, the first polyamine is ethylene diamine and the second polyamine is a polyetheramine; and the excess of first polyamine remaining after the adduct is formed is vacuum distilled to a concentration of less than or equal to 1000 ppm by weight in the adduct. The initial excess of first polyamine in the adduct synthesis is achieved by the use of greater than or equal to 8 $NH_2$ equivalents per epoxy equivalent, wherein unreacted excess polyamine is distilled to a concentration of less than or equal to 1000 ppm.

The coatings formed using the curing agents of the application include, and are not limited to paints and coatings employed in construction. For example, these coatings are typically used with installations of concrete and cement, especially high-gloss concrete installations. Another end use for the coatings includes coating metals. Other end-use applications for the coatings of this application include but are not limited to: wood, plastics, fabrics or non-wovens, and glass.

The curing agents of the application have several advantages over the conventional curing agents. For example, the curing agents of the application have a low amine hydrogen equivalent weight. A low amine hydrogen equivalent weight (AHEW) is an AHEW of less than 105 grams/NH equivalent (g/eq), for example 94 g/eq, based on solids in comparison to conventional curing agent adducts which have an AHEW of greater than 105. A low AHEW allows for a low amine loading in a corrosion resistant formulation (typically, about 5:1 epoxy:amine by weight when using a standard SER (Solid Epoxy Resin) epoxy in the formulation). A low amine loading is less than or equal to 21% of the epoxy component weight when using a standard solid epoxy resin with an epoxy equivalent weight (EEW) of 450-500, assuming an epoxy to amine equivalent ratio of 1. In contrast, conventional curing agents typically load greater than or equal to 25% of the epoxy component weight when using a standard solid epoxy resin with an EEW of 450-500, assuming an epoxy to amine hydrogen equivalent ratio of 1:1.

The presence of lower levels of hydrophilic amines improves corrosion resistance. A lower level of amine is defined as less than or equal to 1 N unit per greater than or equal to 1600 g of epoxy and curing agent weight combined, when using a standard solid epoxy resin with an EEW of 500, assuming an epoxy to amine equivalent ratio of 1. In contrast, conventional curing agents typically have greater than or equal to 1 N unit per 1400 g of epoxy and curing agent weight combined, when using a standard solid epoxy resin with an EEW of 450-500, assuming an epoxy to amine equivalent ratio of 1.

The low loading level of amine also contributes to very low blushing in a clear paint formulation, which is unusual for primary amine curing agents. Thus, a clear paint application can be prepared using the curing agents of the application. Blushing is defined as the substantial absence of haze in a clear paint formulation after curing at ambient conditions for 7 to 14 days; conventional curing agents with primary amine groups often exhibit substantial haze in a clear formulation due to carbamation of the primary amine groups.

Another advantage to those using the curing agents of the application is that the curing agent design is such that the pigment can be ground in the curing agent in spite of the very low loading levels; surprisingly, the curing agent effectively wets the pigment at the very low loading. Coincidentally, the curing agents of the application are shear stable which facilitates their use in pigment grinding.

Additionally, the low loading levels of the curing agents of the application have a further advantage of a curing agent having a Gardner color is less than 5, such as in the range of 1 to 4, for example, from 2 to 3. In contrast, the Gardner color of conventional curing agents is greater than 5. The Gardner color of less than 5 results in less color being transferred to the paint formulation, which is desirable for commercial use and is advantageous in paint coatings sensitive to color.

While not wishing to be bound by any theory, it is nevertheless believed that the use of first polyamines having boiling points of less than or equal to 120° C. at atmospheric pressure, such as ethylenediamine, in the adduct formation results in a distillation process, which can be accomplished by distillation of excess amine, at temperatures less than or equal to 180° C. for 4 hours or less and provide a Gardner color less than 5, such as 2. This is advantageous in a coating formulation and the advantage is further amplified by the ability to use a low loading of the curing agent. Further, the low temperature distillation also reduces cycle time and thus the costs of producing the curing agent. Yet another benefit of the method of the application is that the use of a first polyamine having a boiling point of less than or equal to 120° C. allows for the presence of less than 1000 parts per million by weight (wppm) content of the free first polyamine in the curing agent, which is advantageous in some applications.

In one embodiment, ethylenediamine has been shown to be desirable as the first polyamine in the adduct. In one embodiment where it was shown to be desirable, it was because the curing agents prepared using ethylene diamine produced coatings with superior water and corrosion resistance as compared to coatings produced using similar formulations but other first polyamines.

Surprisingly, it has been observed that water compatibility of the curing agent system suffers if less than 500 weight average molecular weight or more than 1150 weight average molecular weight amine-epoxy adducts are employed. It has been found that adducts with more than 1150 weight average molecular weight (Mw) result in poor water compatibility relative to the adduct of this invention, which means that a clear solution is not obtained when mixing the curing agent made from the higher molecular weight adduct with an equal part by weight of water. Similarly, adducts with weight average molecular weight below 500 made from adducting ethylenediamine with an epoxy resin showed poor water compatibility.

Weight Average molecular weights (Mw) as described herein were measured via Size Exclusion Chromotography using an Agilent 1100 High-Performance Liquid Chromatograph, commercially available from Agilent Technologies Inc, of Germany, equipped with multiple columns (PLgel Mixed-E from Polymer Laboratories) to ensure sufficient molecular weight resolution. The mobile phase used to transport the analyte through the columns was tetrahydrofuran at a rate of 1.0 ml/min. The concentration of particles eluted over time was constantly monitored via a refractive index detector. Narrow weight distribution polystyrene standards from Polymer Laboratories were used to calibrate the instrument.

While the curing agents of the application may be prepared using any method known to be useful to those of ordinary skill in the art (subject to the limitations of the claims), it may be desirable in some embodiments to observe certain reaction conditions. For example, in making the adduct, it may be desirable to spread the epoxy addition over an extended period of time. For example in one embodiment, the epoxy addition can be made over a 2 hour period; while in another embodiment it may be better to make the epoxy addition over a 3 hour period. In an alternative embodiment, the epoxy can be dissolved into a solvent, such as xylenes, to allow for a faster addition to the first polyamine.

In some embodiments of the process of the application, it may be desirable to limit the temperature of the reaction mixture to less than 100° C. during the reaction of the epoxy with the first polyamine. For example in one embodiment it is desirable to maintain the temperature at less than 90° C.

The first polyamine may be distilled using any method known to those of ordinary skill in the art for doing such distillations. However, in most embodiments it is desirable to employ a vacuum distillation system. It is especially desirable if the vacuum distillation system is one that can produce a vacuum of 5 torr or less.

In the practice of the processes of the application, it may be desirable to maintain a nitrogen atmosphere. Performing the processes with little or no oxygen and/or carbon dioxide may be generally desirable.

Similarly, it may be desirable, where practicable, to keep the temperature of the systems at or at least near ambient. For example in one embodiment, the processes may be performed at 50° C. during the addition and blending of the resin with the polyamine and water.

For the purposes of this application, the term "composition" has its normal meaning and does not imply any special chemical connotation, such as "solution," "emulsion," or "mixture."

EXAMPLES

The following examples are provided to illustrate aspects of the invention. The examples are not intended to limit the scope of the invention and they should not be so interpreted. Amounts are in weight parts or weight percentages unless otherwise indicated.

The test methods used in the examples include but are not limited to.

| | |
|---|---|
| Pencil Hardness | ASTM D3363-92a |
| Adhesion (X-cut and cross hatch) | ASTM D3359-93 |
| Impact resistance | ASTM D2794-93 |
| Flexibility (mandrel bend) | ASTM D522-93a |
| Salt fog resistance | ASTM B117-85 |
| Viscosity | ASTM D2196 |
| Impact resistance | ASTM D2794-93 |
| MEK double rubs | ASTM D5402 |
| Dry time | ASTM D5895 |

Example 1

Preparation of Curing Agent

One embodiment of the curing agent was prepared by introducing 500 g by weight of a first polyamine, ethylene diamine, into a reactor and sparging with nitrogen. While maintaining a nitrogen atmosphere, 516 g of a diglycidyl ether of bisphenol A dissolved at 90% solids in xylene, having an epoxy equivalent weight based of 240 (based on solids) is added to the ethylene diamine over about 4 hours. Cooling is used to keep the reaction temperature at less than 90° C. Upon completion of the addition of the epoxy, the reactor is stirred and held at 90° C. for 1 hour. Next, the reactor is subjected to vacuum and residual ethylene diamine and xylene are distilled until the concentration of ethylene diamine is less than 1000 ppm.

Then, 243 g of water is introduced into the reactor over 30-60 minutes and the temperature of the reactor is maintained at about 50 to 75° C. 162 g of a second polyamine, Jeffamine D-230, is introduced under similar conditions; and the reactor is subjected to high shear mixing for 30 minutes at 50 to 75° C. The resultant product is filtered through a 5 μm polyester filter and subjected to physical testing. The resultant product had a solids content of 75%, an amine hydrogen equivalent weight of 94 wt./NH equivalents based on solids, a Gardner color of 2 to 3, a viscosity of 10,700 cp measured at a temperature of 25° C., and a density of 1.10 g/cm3. The amine hydrogen equivalent weight (AHEW) is calculated rather than analyzed. The AHEW for the resultant product is calculated by calculating the NH equivalents contributions from EDA and D-230 in the curing agent and subtracting the epoxy equivalents of the starting epoxy resin used. The weight of the curing agent divided by the remaining NH equivalents is equal to the AHEW.

TABLE 1

| Curing Agent | AHEW (based on solids) | % solids | Color (Gardner) | Solution or Dispersion | Viscosity (cP) |
|---|---|---|---|---|---|
| Example 1 | 94 | 75 | 2 | Solution | 10,700 |
| Anquamine 401 | 140 | 70 | 11-12 | Solution | 30,000 |
| Anquamine 419 | 170 | 60 | 9 | Solution | 10,000 |
| Anquamine 701 | 165 | 53-57 | N/A | Emulsion | 7,500 |
| Anquamine 721 | 138 | 50 | 4 | Solution | 40,000 |
| Dow Oudracure WP8002 | 151 | 50 | 8 | Solution | 3,000 |
| Reichhold Epotuf 37-685 | 160 | 50 | N/A | Emulsion | 50 |
| Beckopox EH 613w | 116 | 80 | Iodine 10 | Solution | 23,000-31,000 |
| EPIKURE ™ 6870-W-53 | 224 | 60 | N/A | Dispersion | 9,000 |

Table 1 illustrates that a curing agent as described in the invention and exemplified by Example 1 has lower AHEW and lower Gardner color in solution form with high solids and effective viscosity, such as a viscosity of less than 30,000 cP as compared to current commercial curing agents.

Example 2

Preparation of a Metal Primer (1) using the Curing Agent of Example 1

A metal primer is prepared by mixing 983.2 g of component A with 86.6 g of component B. The resulting composition is mixed with water in an amount sufficient to achieve a spray viscosity of about 65 kU.

The formulation for components A and B are shown below in Table 2. Dry film properties and salt fog performance were tested and are shown below in Tables 2A, 2B, and Table 4.

The following Chemical names are described as follows:

EFKA 2526 Defoamer is commercially available from BASF (Company) of Florham Park, N.J.

Anti-Terra U 100 is a salt of unsaturated polyamine amide and acidic polyesters, and is commercially available from Byk Additives and Instruments of Austin, Tex.

Ti-Pure R-960 is a rutile titanium dioxide, a pigment, and is commercially available from Dupont of Wilmington, Del.

Sparmite A Barytes is a barium sulfate, an extender pigment, and is commercially available from Ribelin of Garland, Tex.

10ES Wollastocoat is a calcium metasilicate, $CaSiO_3$, and is commercially available from Nyco Minerals, Inc. of Willsboro, N.Y.

Disparlon L-1982N is a polyacrylate, and is commercially available from King Industries, Inc. of Norwalk, Conn.

HALOX SW-111 is strontium phosphosilicate, a corrosion inhibitor, and is commercially available from ICL/Advanced Additives of Hammond, Ind.

Coat-o-sil 11770 Silane is beta-(3,4-Epoxycyclohexyl) ethyltriethoxysilane, and is commercially available from Momentive Performance Materials of Columbus, Ohio Byk 348 is a polyether modified siloxane, used to improve substrate wetting, and is commercially available from Byk Additives and Instruments of Austin, Tex.

TABLE 2

| | Weight (g) |
|---|---|
| A-component: GRIND | |
| EPI-REZ ™ 6520-WH-53: 53% solids, non-ionic aqueous dispersion of a solid diglycidyl ether of bisphenol A with an EEW of 515 | 314.7 |
| Propylene glycol propyl ether (PnP) | 7.3 |
| Dipropylene glycol n-butyl ether (DPnB) | 12.8 |
| EFKA 2526 Defoamer | 3.1 |
| Anti-Terra U 100 | 10.5 |
| Ti-Pure R-960 | 125.9 |
| Sparmite A Barytes | 70.3 |
| 10ES Wollastocoat | 104.9 |
| Disparlon L-1982N | 4.2 |
| HALOX SW-111 | 99.3 |
| Wet Ground Mica, 325 Mesh | 3.1 |
| High speed disperse to 5-6 Hegman, reduce speed while continuing to mix | |
| EPI-REZ ™ 6520-WH-53: 53% solids, non-ionic aqueous dispersion of a solid diglycidyl ether of bisphenol A with an EEW of 515 | 129 |
| Coat-o-sil 11770 Silane | 4.5 |
| Byk 348 | 4.5 |
| Water | 89.1 |
| Total Part A | 983.2 |
| B-component | |
| Example 1 (Control: EPIKURE ™ 6870-W-53) | 43.3 (113.5) |
| Water (Control: Water) | 43.3 (60.8) |
| Total Part B (Control: Total Part B) | 86.6 (174.3) |

Tables 3A and 3B show that, at low amine loading in a paint formulation, the paint formulation using the curing agent described herein has a fast dry time, a good hardness development, good chemical resistance to methylethylketone (MEK), and a good adhesion when applied to metal, relative to a commercially available control curing agent the dispersion-based control, EPIKURE™ 6870 curing agent, commercially available from Momentive Specialty chemicals Inc., of Columbus, Ohio).

Dry Film Properties of Metal Primer Example 1

TABLE 3A

| | | @ 14-day air dry | | |
|---|---|---|---|---|
| Sample | AHEW (BoS) | Cotton Free (Hours) | Through Dry (Hours) | Pencil Hardness |
| Control: EPIKURE ™ 6870-W-53 curing agent: 53% solids, non-ionic aqueous dispersion of a modified polyamine adduct | 223 | 0.5 | 12.75 | H |
| Example 1 | 94 | 1 | 6 | H |

TABLE 3B

| | | @ 14-day air dry | | |
|---|---|---|---|---|
| Sample | AHEW | Adhesion Cross hatch | Direct Impact (in-lb) | MEK Double Rubs |
| Control: EPIKURE ™ 6870-W-53 curing agent: | 223 | 5B | 12 | 23 |

TABLE 3B-continued

|  | | @ 14-day air dry | | |
|---|---|---|---|---|
| Sample | AHEW | Adhesion Cross hatch | Direct Impact (in-lb) | MEK Double Rubs |
| 53% solids, non-ionic aqueous dispersion of a modified polyamine adduct Example 1 | 94 | 5B | 24 | 68 |

Table 4 shows that we have excellent corrosion resistance using the solution curing agent in a paint formulation, relative to the dispersion-based control, EPIKURE™ 6870-W-53 curing agent, commercially available from Momentive Specialty Chemicals Inc. of Columbus, Ohio. With regard to the prior ASTM test numbers, the tests are more fully described as follows. "Cotton Free" dry time is the time it takes for the material to be free of tack (the cotton free term is a result of the fact that this property is often tested with cotton fibers to check for tackiness or stickiness); "Through Dry" means the material is completely dry and is substantially free of volatile components; "Adhesion cross Hatch" is the bonding of the coating to the substrate with 0B being the worst rating and 5B being the best rating or best adhesion of the coating to the substrate; direct impact measures the resistance of the coating to damage by direct impact, where higher numbers indicate better resistance to damage by direct impact; "MEK Double Rubs" test the chemical resistance of the coating to methyl ethyl ketone and is a standard test for chemical resistance, where the number indicates the number of double rubs with a cotton cloth soaked with MEK that the coating was able to withstand before exposing substrate and where higher numbers indicate better chemical resistance to MEK.

For Tables 4, 8, 9, and 13, per the ASTM test, for blistering, a 10 indicates no blistering, and numbers less than 10 indicate blistering with lower numbers corresponding to larger blisters. In particular, a 10 represents no blistering, an 8 represents the smallest size blister easily seen by the unaided eye, and blistering standards 6, 4, and 2 represent progressively larger sizes. D stands for dense, M stands for medium, F stands for few, VF stands for very few. For corrosion, a 10 indicates no corrosion, and numbers less than 10 indicate various degrees of corrosion with smaller numbers indicative of more corrosion. For creepage, the number corresponds to the degree of corrosion expansion at an x-cut on the coating, with smaller numbers indicative of more creepage or more corrosion expansion at the x-cut (larger numbers are preferable).

The ASTM D3359-93 adhesion test involves testing adhesion of the coating by placing a piece of pressure sensitive adhesive tape over an x-cut (A stands for an x-cut method), pulling off the tape, and assessing the degree of coating removed by the tape on a 0 to 5 scale, thus from 0A to 5A scale for x-cut method. The cross-hatch adhesion uses the same scale except with the designation of B in contrast to the x-cut designation of A. A 5A indicates that no coating was removed, a 4A indicates that only trace amounts of coating were removed at the intersection of the x-cut or along the lines of the x-cut, a 3A indicates jagged removal along incisions up to 1.6 mm on either side, a 2A indicates jagged removal along most of the incisions up to 3.2 mm on either side, a 1A indicates removal from most of the area of the x under the tape, and a 0A indicates removal beyond the area of the X.

TABLE 4

1000 Hour Salt Fog Performance of Metal Primer Formulation 1 vs. EPIKURE ™ 6870-W-53, a 53% solids, non-ionic aqueous dispersion of a modified polyamine adduct.

| Sample | @ 1000 hour Salt Fog | | | | Wet Adhesion (@ 1 hour) | Dry Adhesion (@ 24 hour out of salt fog) |
|---|---|---|---|---|---|---|
|  | Field Blister | Corrosion | X cut Blister | Creepage | | |
| Control: EPIKURE ™ 6870-W-53 curing agent: 53% solids, non-ionic aqueous dispersion of a modified polyamine adduct (AHEW = 223) | 8VF | 10 | 2M | 6 | 4A | 5A |
| Example 1 (AHEW = 94) | 8VF | 10 | 6M | 7 | 5A | 4A |

Table 5 shows that we have a 2-3 hour pot life when using the curing agent in a paint formulation from Table 2. The metal primer of table 2 is tested for pot life viscosity growth. The primer is prepared by mixing the formulation disclosed in Table 2. Viscosity growth is observed for 4 hours and recorded below, also in Table 5.

TABLE 5

| POTLIFE-VISCOSITY | |
|---|---|
| Part A of Formulation of Table 5) | 200 gr. |
| Example 1 | 9 gr. |
| DI water | 36 gr. |
| Viscosity, Krebs units (KU) | 65 KU |

| Paint Application Time | Viscosity (KU) of the mixture |
|---|---|
| Initial | 65 |
| 30 min. | 64 |
| 60 min. | 63 |
| 90 min. | 63 |
| 2 HR | 63 |
| 2½ HR | 63 |
| 3 HR | 69 |
| 3½ HR | 126 |
| 4 HR | 136 |

Comparative Example 3

Preparation of a Clear Paint Formulation Using Curing Agent of Example 1

A clear paint formulation is prepared by mixing 651.6 g of component A with 66 g of component B. The resulting composition is mixed with water in an amount sufficient to achieve a spray viscosity of less than or equal to 100 kU.

The formulation for components A and B are shown below in Table 6. Blushing is tested and reported below in Table 7. Table 7 shows that our composition has no blushing when using the solution curing agent in a paint formulation; in fact, the solution curing agent shows identical performance to a more expensive, dispersion based curing agent.

The following Chemical names, if not already described above, are described as follows:

Dowanol PnB is propylene glycol n-butyl ether, and is commercially available from The Dow Chemical Company of Midland, Mich.

Dowanol PPh is a propylene glycol phenyl ether, propylene phenoxytol, 1-phenoxy-2-propanol, or phenoxyisopropanol, and is commercially available from The Dow Chemical Company of Midland, Mich.

Cardura™ E10-P is a glycidyl ester of Versatic™ Acid 10, and is commercially available from Momentive Specialty Chemicals Inc. of Columbus, Ohio.

Byk 307 is a polyether modified poly-(dimethylsiloxane), and is commercially available from Byk Additives and Instruments of Austin, Tex.

TABLE 6

Clear Formulation with Example 1

| A-component: GRIND | Weight |
|---|---|
| EPI-REZ ™ 6520-WH-53: 53% solids, non-ionic aqueous dispersion of a solid diglicydyl ether of bisphenol A with an EEW of 515 | 541.3 |
| Dowanol PnB | 37.8 |
| Dowanol PPh | 37.8 |
| Cardura E10-P | 14 |
| Byk 307 | 5.8 |
| Water | 14.9 |
| Total Part A | 651.6 |
| B-component | |
| Example 1 (EPIKURE ™ 6870-W-53) | 66 (240) |
| Total Part B | 66 (240) |

TABLE 7

Properties of Clear Formulation with Example 1 on Glass

| Examples | Blushing |
|---|---|
| Clear Paint Formulation with Example 1 | No blushing |
| Paint Formulation of Example 1 using EPIKURE ™ 6870-W-53 curing agent: 53% solids, non-ionic aqueous dispersion of a modified polyamine adduct | No blushing |

The Blushing test was performed in a Caron chamber at 55° F./60% humidity for 2 weeks. The control curing agent is EPIKURE™ 6870-W-53 curing agent, which is a commercially available curing agent with very low blushing characteristics in clear film.

Comparative Example 4

Higher Amine Hydrogen Equivalent Weight Curing Agent Performance Relative to Example 1

In Comparative Example 4 epoxy-amine adducts are prepared in the same manner as Example 1, except that diglycidyl ether of bisphenol A dissolved at 80% solids in xylene, having an epoxy equivalent weight of 310 (based on solids), is used instead of a diglycidyl ether of bisphenol A dissolved at 90% solids in xylene, having an epoxy equivalent weight based of 240 (using a 9 times excess of $NH_2$ equivalents per epoxy equivalent in the adduct formation) and Huntsman Jeffamine D-230 is replaced with Huntsman Jeffamine D-400, to test the effect of higher amine hydrogen equivalent weight and higher amine loading on film properties and corrosion resistance. The amine hydrogen equivalent weight of this adduct is 121 g/eq (BoS), resulting in 30% more curing agent loading into the paint formulation in Table 2. Further, a commercially available waterborne amine curing agent with an amine hydrogen equivalent weight=140 (BoS) was compared, also using the paint formulation of Table 2. These higher amine hydrogen equivalent weight curing agents did not perform as well as the curing agent of Example 1 for outstanding salt fog testing, due to blistering of the film and poor adhesion, respectively. This is evidence that the low amine hydrogen equivalent weight and low amine loading of Example 1 is necessary for good salt fog performance. The results of the physical testing are displayed below in Tables 8 and 9.

Tables 8 and 9 disclose that low AHEW and low amine loading in the paint formulation of Table 2 using the respective curing agents listed below contribute to improved corrosion resistance.

TABLE 8

| Sample | AHEW | Wet Adhesion (@ 1 hour) | Dry Adhesion (@ 24 hour out of salt fog) |
|---|---|---|---|
| Coating using curing agent of Comparative Example 4: adduct of ethylenediamine with diglycidyl ether of bisphenol A having an epoxy equivalent weight of 310, dissolved in JEFFAMINE ™ D-400 and water | 121 | 4A | 5A |
| Product using curing agent of Example 1 | 94 | 5A | 4A |
| Coating using commercial waterborne curing agent | 140 | 0A | 0A |

TABLE 9

| | | @ 1000 hour Salt Fog | | |
|---|---|---|---|---|
| Sample # | AHEW | Field Blister | X cut Blister | Creepage |
| Product using curing agent of Comparative Example 4: adduct of ethylenediamine with diglycidyl ether of bisphenol A having an epoxy equivalent weight of 310, dissolved in JEFFAMINE ™ D-400 and water | 121 | 4M | 4M | 7 |
| Control: EPIKURE ™ 6870-W-53 curing agent: 53% solids, non-ionic aqueous dispersion of a modified polyamine adduct | 223 | 8VF | 2M | 6 |
| Product using curing agent of Example 1 | 94 | 10 | 8F | 7 |

4A, 5A=acceptable adhesion
0A=very poor adhesion
4M=larger blisters of significant concentration
8F=only a few very small blisters
10=no blistering Comparative Examples 5-10

Preparation of Amine-Epoxy Adducts with Increased Molecular Weight and Negative Effect on Water Uptake In Comparative Examples 5-7, epoxy-amine adducts are prepared in the same manner as Example 1, using varying levels of ethylene diamine (EDA) excess as a method of varying the molecular weight of the adduct. It was observed that using less than a 8 times excess of $NH_2$ equivalents in EDA relative to epoxy equivalents, when preparing the adduct of Example 1, resulted in GPC weight average molecular weights that were too high to provide adequate water uptake for the curing agent. Thus, the adduct is limited to a weight average molecular weight (Mw) of less than 1150 (as determined using a polystyrene standard) to provide adequate water uptake. An 8 times or greater molar excess of $NH_2$ equivalents relative to epoxy is required to achieve the desired water uptake.

In particular, Comparative Example 5 was prepared by introducing 172 g of a first polyamine, ethylene diamine, into a reactor and sparging with nitrogen. While maintaining a nitrogen pad, 524 grams of a diglycidyl ether of bisphenol A dissolved at 90% solids in xylene, having an epoxy equivalent weight based of 240 (based on solids) is added to the ethylene diamine over about 4 hours. The temperature of the reaction is maintained at less than 90° C. by cooling. Upon completion of the addition of the epoxy, the reactor is stirred and held at 90° C. for 1 hour. Next, the reactor is subjected to vacuum and residual ethylene diamine and xylene are distilled until the concentration of ethylene diamine is less than 1000 ppm. The Mw of Table 10 was measured for this adduct. The adduct was diluted similarly to Example 1 with Jeffamine D-230 and water to measure the viscosity and water uptake of Table 10.

Comparative Examples 6, 7, and 8 are made the same as Example 1 with the ratio of $NH_2$ equivalents per epoxy equivalents used being 6:1, 7:1 and 8:1, respectively, rather than 9:1 as mentioned for Example 1. As with comparative example 5, the Mw of the adduct is the Mw reported in Table 10. The adducts were diluted with Jeffamine D-230 and water, similar to Example 1, in order to measure the viscosity and water uptake of Table 10.

In Comparative Example 9, an epoxy-amine adduct was prepared in the same way as Example 1, except using a diglycidyl ether of bisphenol A with an EEW of 470 in place of a diglycidyl ether of bisphenol A with an EEW of 240 as a means of increasing the molecular weight of the adduct. This adduct was incompatible with water (very poor water uptake), providing further evidence that increasing molecular weight hurts water compatibility and usability of the epoxy-amine curing agent adduct.

In Comparative Example 10, an epoxy-amine adduct is prepared in the same way as Example 1 using 9 $NH_2$ equivalents per epoxy equivalent in the formation of the adduct, except using a diglycidyl ether of bisphenol F with an EEW of 170 in place of a diglycidyl ether of bisphenol A with an EEW of 240 as a means of decreasing the molecular weight of the adduct. The adduct was incompatible with water (very poor water uptake), providing evidence that decreasing molecular weight hurts water compatibility and usability of the epoxy-amine curing agent adduct.

TABLE 10

| Samples | Excess EDA (Ratio of $NH_2$ equivalents per epoxy equivalent used to make the adduct) | EEW of Epoxy in Adduct | GPC PS-RI Weight Average Mw | Brookfield Viscosity (cP, 25° C., 27@10) | Water uptake (1:1) | Pass/Fail |
|---|---|---|---|---|---|---|
| Comp Ex: 5 | 3:1 | 240 | 1619 | 35000 | Poor (incompatible) | Fail |
| Comp Ex: 6 | 6:1 | 240 | 1158 | 16300 | Poor (incompatible) | Fail |
| Comp Ex: 7 | 7:1 | 240 | 1024 | 14025 | Intermediate (hazy, milky-white) | Intermediate |
| Comp Ex: 8 | 8:1 | 240 | 959 | 11088 | Clear | Pass |
| Example 1 | 9:1 | 240 | 883 | 10700 | Clear | Pass |
| Comp Ex: 9 | 9:1 | 470 | — | — | Poor (incompatible) | Fail |
| Comp Ex: 10 | 9:1 | 170 | — | — | Poor (incompatible) | Fail |

In Table 10, it is demonstrated that the molecular weight of the adduct is crucial to curing agent compatibility with water. When the ratio of diglycidyl ether of bisphenol A with an EEW of 240 to ethylene diamine (EDA) in the synthesis of the adduct is 1:8 or 1:9, the adduct has a weight average molecular weight of less than 1000 and the resulting curing agent composition is soluble in water at a 1:1 ratio of curing agent to water by weight. When the ratio of diglycidyl ether of bisphenol A with an EEW of 240 to EDA in the synthesis of the adduct is 1:7, the molecular weight of the adduct increases to 1024 and the resulting curing agent composition is not fully soluble in water (hazy, intermediate solubility). When the ratio of diglycidyl ether of bisphenol A with an EEW of 240 to EDA is 1:6, the molecular weight increases further to 1158 and the curing agent composition is completely incompatible with water. Similarly, when the ratio of diglycidyl ether of bisphenol A with an EEW of 240 to EDA is 1:3, the molecular weight increases even further to 1619 and the curing agent composition remains incompatible with water. In a separate experiment, the molecular weight of the adduct was increased by using a heavier solid epoxy resin with an EEW of 470 instead of 240; this adduct was completely immiscible with water, providing further evidence that increasing adduct molecular weight hurts water compatibility. Surprisingly, when the molecular weight of the adduct was reduced by using an epoxy with an EEW of 170 instead of 240, the adduct again was not compatible with water. This series of experiments demonstrates that the molecular weight of the adduct is important to water compatibility of the curing agent since too high or too low a molecular weight worsens water compatibility, which is necessary for curing agent performance. Adducts made using an epoxy of EEW 230-280 and with an epoxy:EDA ratio of at least 1:8 in the synthesis of the adduct provide superior performance. Adducts made using an epoxy of EEW 230-280 and with an epoxy:EDA ratio of at least 1:7 provide marginal performance and are better than adducts made using an epoxy:EDA ratio of 1:6 or 1:3.

Comparative Example 11

Preparation of Amine-Epoxy Adduct with Increased Amine Hydrogen Equivalent Weight and Nitrogen Content In Comparative Example 11, an epoxy-amine adduct is prepared in the same way as Example 1 using 9 $NH_2$ equivalents per epoxy equivalent in the formation of the adduct, except using triethylenetetraamine (TETA) in place of EDA as a means of increasing the nitrogen content of the curing agent adduct. The color of this adduct is Gardner 6, rather than Gardner 2 (Example 1), which is believed to be due to the increased heat required to distill the high boiling amine (temperatures as high as 240° C. are required to completely vacuum distill the TETA, versus a maximum temperature of 180° C. for the EDA distillation). Coating performance of this adduct relative to Example 1 is presented in Tables 11 and 12 below. In addition to the negative effect on color, the use of TETA led to some decreases in film performance: the coating was considerably softer after 14-day cure (2B vs. H for Example 1), direct impact resistance was considerably less (12 versus 24), and MEK resistance was considerably worse (23 double rubs vs. 68 for Example 1). Field and x-cut blistering were also slightly worse with the TETA-adduct in salt fog testing. This data demonstrates that the EDA-epoxy adduct is preferable to the TETA adduct for cost reduction in manufacture, for color of the curing agent (which could be transferred to the coating in sensitive applications), for general film properties (particularly, pencil hardness, direct impact, and MEK resistance), and for corrosion resistance. Table 11 shows that the use of the low boiling amine results in lower color of the curing agent adduct; Table 12 shows that using EDA as the first polyamine in the adduct provides good pencil hardness, direct impact, and MEK chemical resistance relative to using TETA as the first polyamine; Table 13 shows that the corrosion resistance of the curing agent using EDA as the first polyamine in the adduct is better than when TETA is used.

TABLE 11

Color of TETA-epoxy adduct versus Example 1

| Adduct Samples | Color (Gardner) |
|---|---|
| Example 1 | 2 |
| Adduct of TETA with | 6 |
| diglycidyl ether of bisphenol A (EEW 240) in Jeffamine ™ D-230/water | |

TABLE 12

Dry Film Properties of TETA-epoxy adduct versus Example 1

| | @ 14-day air dry | | |
|---|---|---|---|
| Sample | Pencil hardness | Direct impact | MEK double rubs |
| Example 1 | H | 24 | 68 |
| Adduct of TETA with diglycidyl ether of bisphenol A (EEW 240) in Jeffamine ™ D-230/water | 2B | 12 | 23 |

TABLE 13

500-hour Salt Fog Comparison of TETA-epoxy adduct versus Example 1 and EPIKURE ™ 6870-W-53 curing agent control

| | @ 500 hour Salt Fog | |
|---|---|---|
| Sample | Field Blister | Blister at scribe |
| Example 1 | 10 | 8VF |
| Adduct of TETA with diglycidyl ether of bisphenol A (EEW 240) in Jeffamine ™ D-230/water | 8VF | 8M |

While the present invention has been described and illustrated by reference to particular embodiments, those of ordinary skill in the art will appreciate that the invention lends itself to variations not necessarily illustrated herein.

What is claimed is:

1. A curing agent composition for epoxy coatings comprising:
   an adduct of:
      a diglycidyl ether of a bisphenol having an epoxy equivalent weight from about 200 to about 300, and
      a first polyamine;
   a second polyamine different than the first polyamine; and
   water;
   wherein the composition is a solution, wherein the composition has an amine hydrogen equivalent weight, based on solids, of less than 105.

2. The curing agent of claim 1 wherein the diglycidyl ether of the bisphenol has an epoxy equivalent weight from about 220 to about 285.

3. The curing agent of claim 1 wherein the diglycidyl ether of the bisphenol has an epoxy equivalent weight from about 235 to about 263.

4. The curing agent of claim 1 wherein the first polyamine has an amine hydrogen equivalent weight from about 7 to about 35.

5. The curing agent of claim 4 wherein the first polyamine has an amine hydrogen equivalent weight from about 13 to about 27.

6. The curing agent of claim 1 wherein the adduct has a weight average molecular weight less than or equal to 1150.

7. The curing agent of claim 6, wherein the adduct has a molecular weight from about 580 to about 1000.

8. The curing agent of claim 1 wherein the composition has an amine hydrogen equivalent weight, based on solids, of greater than or equal to about 50 and less than 105.

9. The curing agent of claim 8 wherein the composition has an amine hydrogen equivalent weight, based on solids, of about 87 to about 96.

10. The curing agent of claim 1 wherein the first polyamine is ethylene diamine and the second polyamine is a polyetheramine.

11. The curing agent of claim 1 wherein the adduct is formed by reacting an excess of the first polyamine with the diglycidyl ether of a bisphenol at a ratio of epoxy equivalents to $NH_2$ equivalents from about 1:8 to about 1:40.

12. The curing agent of claim 1 wherein the composition comprises from about 10 wt. % to about 90 wt. % of the adduct;

from about 10 wt. % to about 90 wt. % of the second polyamine; and from about 1 wt. % to about 50 wt. % of water, wherein the total wt. % is 100 wt. %.

13. The curing agent of claim 1, wherein the composition further comprises one or more components selected from the group consisting of acids, organic solvents, surfactants, fillers, defoamers, leveling agents, flow agents, wetting agents, cure rate accelerators, and combinations thereof.

14. The curing agent of claim 1, wherein the second polyamine has an amine hydrogen equivalent weight from about 40 to about 120.

15. The curing agent of claim 1 wherein the composition is free of surfactants, free of dispersing agents, or free of both.

* * * * *